US012513525B2

United States Patent
Beck et al.

(10) Patent No.: US 12,513,525 B2
(45) Date of Patent: Dec. 30, 2025

(54) DEVICE MODIFICATION STATE VALIDATION

(71) Applicant: Lenovo (Singapore) Pte. Ltd., Singapore (SG)

(72) Inventors: Kevin W. Beck, Raleigh, NC (US); Robert James Norton, Jr., Raleigh, NC (US); Justin Ringuette, Cary, NC (US); Sandy Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 18/356,505

(22) Filed: Jul. 21, 2023

(65) Prior Publication Data

US 2025/0031047 A1  Jan. 23, 2025

(51) Int. Cl.
*H04W 12/128* (2021.01)

(52) U.S. Cl.
CPC .............................. *H04W 12/128* (2021.01)

(58) Field of Classification Search
CPC ... H04W 12/128; H04W 12/06; H04W 12/08; H04W 12/086; H04W 12/10; H04W 12/108; H04W 12/12; H04W 12/30; H04W 12/47
See application file for complete search history.

(56) References Cited

U.S. PATENT DOCUMENTS

| | | | | |
|---|---|---|---|---|
| 8,015,408 B2* | 9/2011 | Movva | ............... | H04W 12/10 713/169 |
| 8,230,511 B2* | 7/2012 | Khilnani | ............... | G06F 21/567 726/28 |
| 9,882,934 B2* | 1/2018 | Elias | ............... | H04L 63/20 |
| 10,362,136 B2* | 7/2019 | Tankha | ............... | H04W 12/08 |
| 10,417,421 B2* | 9/2019 | Touboul | ............... | H04W 12/00 |
| 2011/0078796 A1* | 3/2011 | Khilnani | ............... | G06F 21/567 726/24 |
| 2014/0129815 A9* | 5/2014 | Shah | ............... | H04W 12/108 726/34 |
| 2015/0288659 A1* | 10/2015 | Lukacs | ............... | G06F 9/4416 713/2 |
| 2017/0083690 A1* | 3/2017 | Fischer | ............... | H04L 63/08 |
| 2022/0171851 A1* | 6/2022 | Tsirkin | ............... | G06F 21/577 |

* cited by examiner

*Primary Examiner* — Hosuk Song
(74) *Attorney, Agent, or Firm* — FERENCE & ASSOCIATES LLC

(57) ABSTRACT

One embodiment provides a method, the method including: receiving, at a device validation system and utilizing a wireless communication mechanism, current state information identifying a current configuration of a device; obtaining, using the device validation system and from a data store including trusted state information for a plurality of devices, trusted state information for the device that identifies a trusted configuration of the device; identifying, using the device validation system, a modification state of the device by comparing the current state information to the trusted state information of the device; and providing, at an output component of the device validation system, a notification indicating whether the device has been modified from the trusted state information based upon the identified modification state of the device. Other aspects are claimed and described.

20 Claims, 3 Drawing Sheets

DEVICE MODIFICATION STATE VALIDATION

BACKGROUND

When devices (e.g., laptop computers, tablets, desktop computers, smart phones, smart watches, appliances, televisions, etc.) are manufactured they are configured with different components and software. At the time of manufacture the manufacturer may identify and record the components and software that were installed on or configured within the device. In other words, the manufacturer may keep track of the configuration, including software, firmware, hardware, and/or the like, of a device when the device is manufactured. This configuration information may be stored by the manufacturer for a later use, for example, to verify a configuration of a device, identify an initial configuration of a device, identify devices that have a particular hardware or software component, identify devices that may need software or hardware upgrades, and/or the like.

BRIEF SUMMARY

In summary, one aspect provides a method, the method including: receiving, at a device validation system and utilizing a wireless communication mechanism, current state information identifying a current configuration of a device; obtaining, using the device validation system and from a data store including trusted state information for a plurality of devices, trusted state information for the device that identifies a trusted configuration of the device; identifying, using the device validation system, a modification state of the device by comparing the current state information to the trusted state information of the device; and providing, at an output component of the device validation system, a notification indicating whether the device has been modified from the trusted state information based upon the identified modification state of the device.

Another aspect provides an system, the system including: a wireless communication mechanism; a processor operatively connected to the wireless communication mechanism; a memory device that stores instructions that, when executed by the processor, causes the system to: receive, at a device validation system and utilizing the wireless communication mechanism, current state information identifying a current configuration of a device; obtain, using the device validation system and from a data store including trusted state information for a plurality of devices, trusted state information for the device that identifies a trusted configuration of the device; identify, using the device validation system, a modification state of the device by comparing the current state information to the trusted state information of the device; and provide, at an output component of the device validation system, a notification indicating whether the device has been modified from the trusted state information based upon the identified modification state of the device.

A further aspect provides a product, the product including: a computer-readable storage device that stores executable code that, when executed by a processor, causes the product to: receive, at a device validation system and utilizing a wireless communication mechanism, current state information identifying a current configuration of a device; obtain, using the device validation system and from a data store including trusted state information for a plurality of devices, trusted state information for the device that identifies a trusted configuration of the device; identify, using the device validation system, a modification state of the device by comparing the current state information to the trusted state information of the device; and provide, at an output component of the device validation system, a notification indicating whether the device has been modified from the trusted state information based upon the identified modification state of the device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
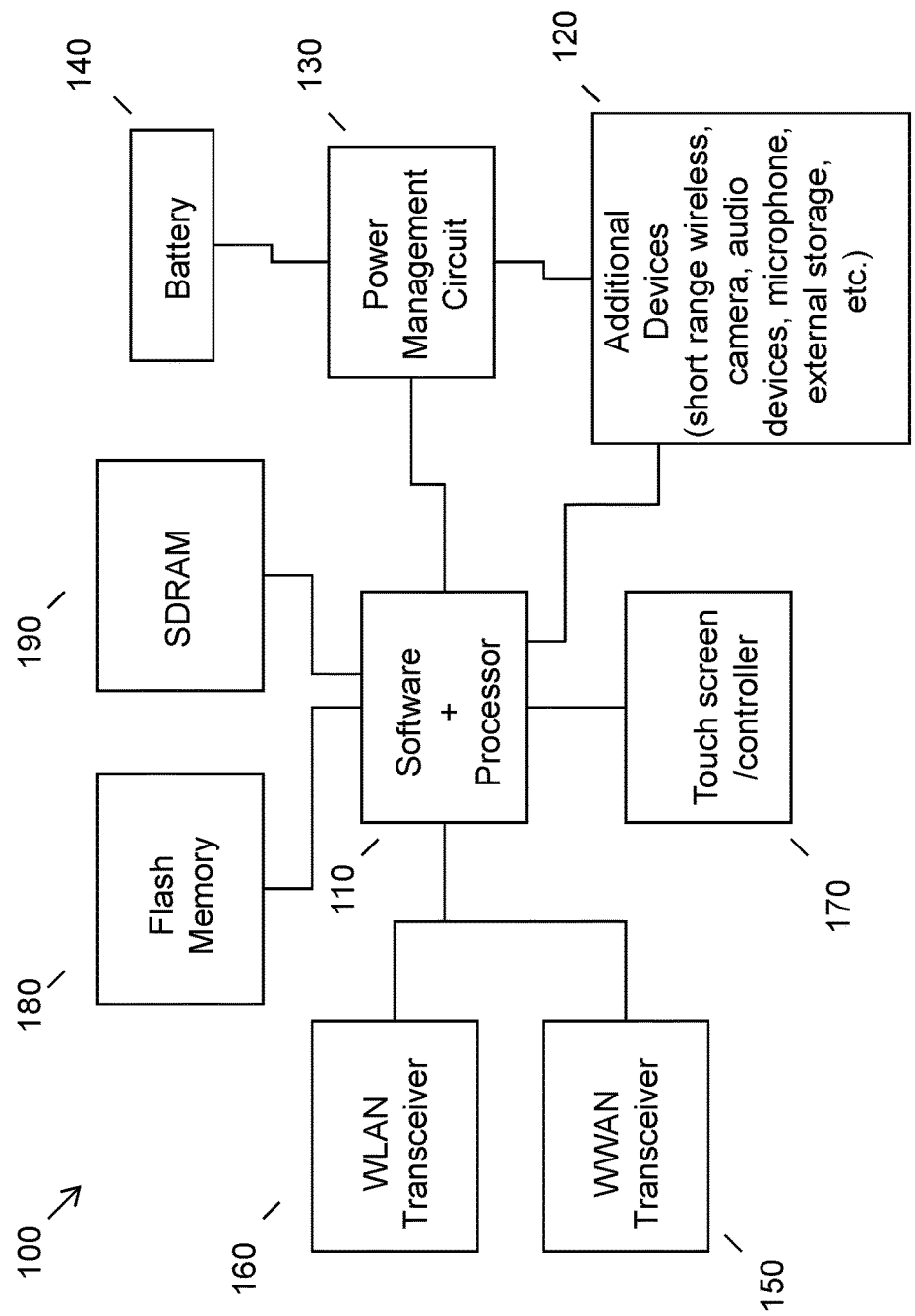
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One common use for initial or trusted configuration information for a device is to ensure that a device has not been tampered with, for example, by changing hardware components, introducing malware, changing software, introducing malicious components or software, injecting code, and/or the like. The trusted state information can be used as a comparison for current state information. In other words, a user can capture state or configuration information for a device and then compare that captured state information to the trusted state information. The comparison can flag any changes that have been made to the device since the trusted state information was generated. The user can then determine if the changes reflect that the device has been tampered with.

One current technique for validating a device against trusted state information is to access the device to be validated and running a local tool that is stored on the device. The local tool scans the device to determine a current state or configuration of the device. This identifies what current components, software, code, firmware, and/or the like, is current installed or configured on the device. The user provides the device with the trusted state information and the local tool then compares the current state information to the trusted state information. Thus, the device itself can determine whether it has been modified. This process is very slow and is a very manual process where the user has to be involved in the process to provide information and respond to prompts on the device. Thus, this process does not lend itself to being automated or even partially automated. Additionally, this process can only be performed on a one-by-one basis, meaning each device has to be accessed and a local tool for each device has to be accessed and executed. On the other hand, this process is very secure as it does not expose other networks or devices to any potential malicious content that may be stored on the device.

Another current technique for validating a device against trusted state information is the use of a server-based application or tool. Using this server-based tool, multiple devices under validation can be connected to the network housing the server-based application. The application then scans the devices to obtain current state information for each of the devices. These current state information scans can then be compared, by the application, to the trusted state information corresponding to each of the devices. This technique is significantly quicker than the manual technique and allows for some automation of the validation process. However, this technique is less secure than the local process because the devices are connected to a network. While the network is generally one that is specifically designed to perform these tasks and is, therefore, not connected to a production network, any malicious content on one of the devices could infect the network and could infect other devices that are in the process of being validated. Thus, while such infection is not as bad as it would be on a production network, this infection still causes a lot of lost time and extra work to correct the issue.

Accordingly, the described system and method provides a technique for validating whether a device has been modified based upon a comparison of a current configuration of the device to a trusted configuration of the device utilizing a secure validation technique. The device validation system utilizes a wireless communication mechanism to receive current state information for a device. The current state information identifies the components, software, firmware, and/or other configurations of the device as it sits. The device validation system obtains trusted state information for the device that identifies a trusted configuration of the device. In other words, the trusted state information identifies the components, software, firmware, and/or other configurations of the device when the device was in a known good or trusted state, for example, at the time of manufacture. Obtaining the trusted state information may include accessing a data store that contains trusted state information for a plurality of devices. The device validation system can provide identifiers for the device in order to access the trusted state information.

Once the validation system has the current state information and the trusted state information, the validation system identifies a modification state of the device by comparing the current state information of the device to the trusted state information of the device. The modification state identifies any components, software, firmware, and/or any other configurations that are different between the current state and the trusted state of the device. Upon identifying any modifications, the validation system provides a notification to a user from an output component of the validation system identifying modifications to the device, if any. The output could be as simple as indicating whether there are any modifications or not. The output may also describe or identify the modifications in the event that the device has been modified.

Therefore, a system provides a technical improvement over traditional methods for validating a modification state of a device. The described system and method does not require a user to manually access and interact with a single device to perform the validation, thereby providing a more efficient and user friendly technique to perform device validation than some conventional techniques. However, the described system and method also provides a secure technique for performing the validation that does not expose other systems or devices to possible contamination from any malicious content that may be present on a device, thereby provide a more secure technique than other conventional techniques. Additionally, the described system and method does not require additional software, applications, or tools to be installed on the device before the device validation can occur, as is required by some conventional techniques. Thus, the described system and method provides a technique that allows for automation or semi-automation of the validation technique, the ability to validate multiple machines simultaneously or in very quick succession, and is also very secure such that any malicious content on a device will not infect other systems or devices.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
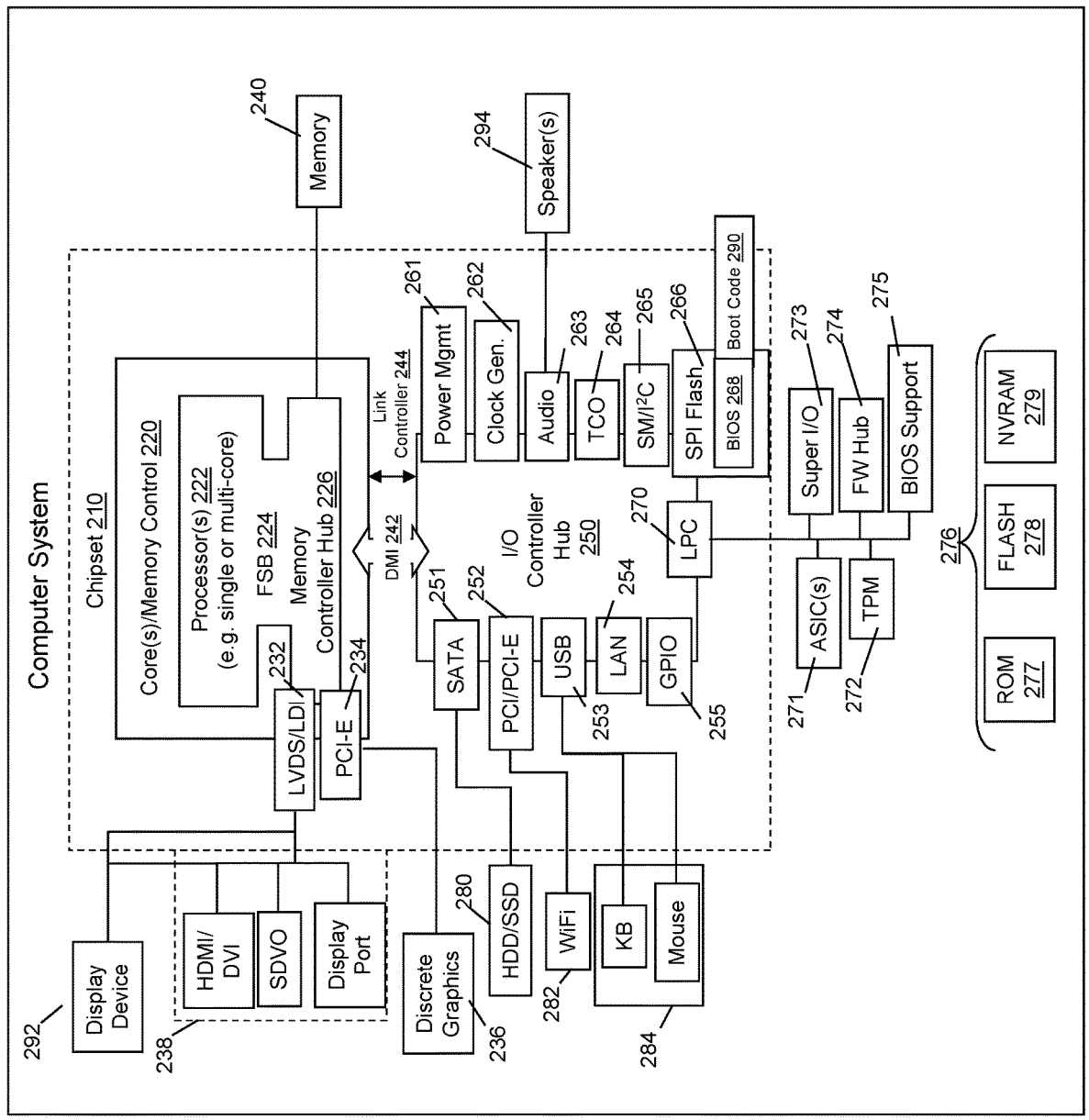
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in devices or systems that can be used to validate a modification state of a device, devices that are being validated, devices used to store device state information, and/or the like. For example, the circuitry outlined in FIG. 1 may be implemented in a tablet or smart phone embodiment, whereas the circuitry outlined in FIG. 2 may be implemented in a personal computer embodiment.

Figure 3:
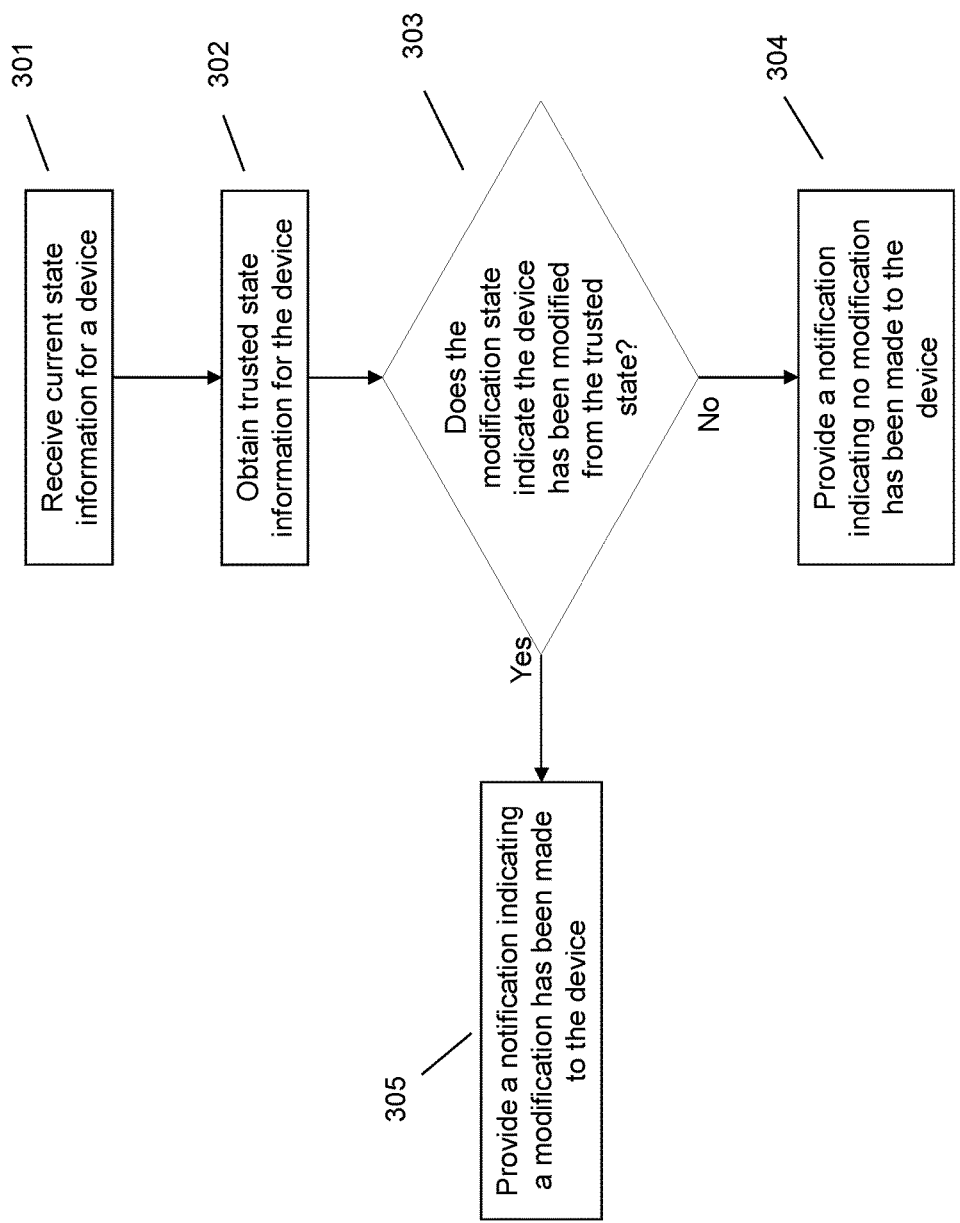
FIG. 3 illustrates an example method for validating whether a device has been modified based upon a comparison of a current configuration of the device to a trusted configuration of the device utilizing a secure validation technique.

FIG. 3 illustrates an example method for validating whether a device has been modified based upon a comparison of a current configuration of the device to a trusted configuration of the device utilizing a secure validation technique. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to validate a modification state of a device utilizing a secure validation technique. Additionally, the device validation system includes modules and features that are unique to the described system.

The main example that will be used here throughout is a supply chain that starts at a device manufacturer and ends with a retailer. In this case, the trusted state information may be generated when the device is manufactured and stored at some trusted data store of the manufacturer. However, this example is not intended to limit the use of the described system and method to a supply chain with the identified source and destination location. Additionally, the trusted state information is not limited to only the state information created by a device manufacturer. Other instances of trusted state information may be generated and stored at different entities. For example, trusted state information may be generated by an information technology (IT) services department within a company and thereafter allow the IT department to verify whether an employee or another entity has modified the device from the state set by the IT department. As another example, trusted state information may be generated by a company that modifies devices under permission from the manufacturer.

Other example scenarios may include validating devices that have been in long term storage to ensure the continued integrity of a device, allowing a manufacturer to validate a device received from a customer for warranty claims, multiple validations in a supply chain transit, and/or the like. In other words, the trusted state information may be generated by any entity that may modify the device and wants to identify and save the information identifying the "correct" or trusted configuration of the device, thereby allowing comparison of any subsequent state of the device to the trusted state information. Since the trusted state information is generated at a trusted entity and the current state information is generated when the device is to be validated, which may be after the device has been shipped, the current state information and the trusted state information may be generated or produced at different physical locations within a supply chain system, for a non-limiting example, at the manufacturer for the trusted state information and an end user or retailer for the current state information.

When a trusted configuration is captured, component, platform, system, software, and/or the like, information is taken and stored. For example, a number of snapshots may be taken of the existing state of the system as it is built, modified by a trusted source, and/or the like. The trusted configuration identifies not only the hardware, software, firmware, and/or other configuration information for the device, but also includes specific information regarding the configuration information. For example, rather than simply identifying that the device includes a processor, the trusted configuration identifies the processor manufacturer, processor model, processor specification and/or capabilities, processor serial number or other identifier, and/or the like. The level of detail may vary based upon the component, software, firmware, and/or the like, but the trusted configuration includes enough identifying information that allows a comparison to be made to any subsequent state information and a determination regarding whether the device has been modified.

The trusted configuration may include component data (e.g., vendor, part number, serial number, validation history, etc.), platform data (e.g., model number, platform configuration register data, processor, memory disk, etc.), and certificate data (e.g., endorsement key, endorsement key serial number, etc.). All of this data is packaged together as the trusted state information. The trusted state information is transmitted as data to a data store that stores the trusted state information in a manner that allows for access later. For example, the trusted state information is assigned, tagged, or otherwise marked with information that allows for identifying which device the trusted state information belongs to. The marking information may include a device identifier, device model, device type (e.g., smart phone, tablet, laptop computer, augmented reality display, etc.), serial number, and/or any other identifying information.

Additionally, to ensure that the trusted state information is not modified, destroyed, improperly used, and/or the like, the trusted configuration information may be encrypted, for example, as a signed certificate, a hash, and/or the like. Each of the parts of the trusted configuration information may encrypted separately within the trusted state information package. For example, the component data may be a signed certificate, the platform data may be another signed certificate, and the certificate data may be a third signed certificate. The marking information may also be encrypted. The encryption of either the trusted state information and/or the marking information may be performed utilizing any type of encryption technique, for example, symmetric encryption, asymmetric encryption, hashing, and/or the like. The encryption technique selected may be the same or different for the trusted state information and the marking information.

The device validation system may include one or more components. In the event of more the one component, the components may work and communicate together to effectuate the described system and method. The components may be integral to a single device or may be separate components, with some components being parts of other devices. Regardless of the physical location of the components, the components are in operative communication with each other to perform the steps of the described system. Some of the components may be dedicated to performing one or more steps of the described method. The components may then output data, either as captured or derived from captured or received data, to other components which may utilize the output data to perform a next step of the process. As one example, the device validation system may include a wireless communication mechanism for receiving current configuration information from a device, a communication mechanism that allows communication with the data store, an analysis component for identifying a modification state of the device, and an output device to provide a notification regarding the modification state a user.

As one example system, the device validation system may include an augmented reality (AR) headset that can receive the current state information from a device. For example, the AR headset may include a camera that can capture a quick response (QR) code on the device that includes the current state information. The AR headset may communicate with the data store to obtain the trusted state information for the device using a communication mechanism. The AR headset may include a processor that can identify the modification state of the device utilizing the current state information and the trusted state information. Based on the modification state of the device, the AR headset may provide a notification on the display of the AR headset reflecting the modification state of the device. This example system is not intended to be limiting as many other types of systems could be utilized, for example, a laptop or tablet device, a dedicated scanner and validation tool, and/or the like.

At 301, the device validation system may receive current state information identifying a current configuration of a device. The current configuration of the device refers to the hardware components, software, firmware, and/or other configuration information of the device. Thus, the current state information identifies components and software currently installed on the device. The current state information may also identify other information regarding the configuration of the device. For example, the current state information may not only identify a hardware component that is installed, but may also identify a manufacturer of the component, a component identifier, a component model, the component specifications or capabilities, and/or the like. Like the trusted state information, the current state information provides a level of detail that allows an accurate comparison and determination of whether a modification was made to the device. Thus, the current state information may also include component data, platform data, certificate data, and/or the like.

To obtain the current state information, a system scan may be performed by the device. The system scan allows the device to determine a current state of the device. The system scan or scans may be performed in response to receiving one or more triggers indicating a system scan needs to be performed. For example, a user can provide an input to the device that instructs the device to perform a system scan, for example, selecting a system scan icon, providing code instructing the device to perform a system scan, accessing administrator functions that allow performance of a system scan, and/or the like. The device may also be programmed to perform a system scan upon receiving a particular trigger. For example, the device may be programmed to perform a system scan when the device is booted for the first time or if the device has been unused for a predetermined period of time. Other triggers are contemplated and possible.

The current state information may be received utilizing a wireless communication mechanism. The device validation system may utilize a wireless communication mechanism to ensure an air-gap between the device and the device validation system or any other systems or components that may be near or connectable to the device. This ensures that in the event the device includes malicious content, the malicious content cannot be transmitted to other devices, the device validation system, or any other components, systems, and/or networks that may be within transmission range. To ensure the security of the communication, the transmission may be encrypted. This allows only the device validation system to receive and access the current state information, thereby prevent other devices, components, and/or actors, from accessing the current state information. The encryption may be performed utilizing any of a number of encryption techniques.

Additionally, to further ensure the security of the communication, the wireless communication mechanism may only allow transmission of information from the device. In other words, the wireless communication mechanism may be a one-way wireless communication mechanism that is a transmission-only communication method. This prevents malicious content from the device from being able to access the device validation system and get information that could provide or would have shown that the device was untampered. In other words, because the communication channel only allows one way communication and the transmission is encrypted, a malicious actor who has loaded malicious content on the device that would cause the device to communicate with the device validation system and trick it into thinking the device has not been tampered with, is unable to receive communications from the device validation system and, therefore, cannot trick the system into showing a false clean.

Thus, the wireless communication mechanism may include any wireless communication mechanism that can support the functionality described, for example, near field communication, radio frequency communication, a quick response code that is generated on a display of the device and read by the device validation system, ultrasonic communication, short range communication, and/or the like. Accordingly, the wireless communication mechanism and/or device validation system may include any components that are necessary for facilitating the wireless communication. For example, the wireless communication mechanism and/or device validations system may include an image capture device, radio frequency transmitter and/or receiver, near field and/or short range wireless communication device, ultrasonic communication device, and/or the like.

At 302, the device validation system may obtain trusted state information for the device that identifies a trusted configuration of the device. To obtain the trusted state information, the device validation system may access the data store that contains the trusted state information for a plurality of devices, as previously described. It should be noted that accessing the data store may simply include sending a request or query to the data store and may not include opening or otherwise interacting with the data store. In other words, accessing the data store may simply include transmitting and receiving communications with the data store and may not include opening or viewing the data store or any information contained within the data store. Additionally, to ensure the security of the information, the data store may transmit or otherwise provide the trusted state information corresponding to the device to the device validation system in an encrypted format. Thus, the device validation system may include information that allows it to decrypt information received from the data store, such as an encryption key, decryption code, and/or the like.

In order to obtain the correct trusted state information that corresponds to the device, the device validation system may provide a unique identifier or other identifying information to the data store, where the provided identifying information corresponds to the device. In other words, using the identifying information for the device, the system may query the data store to find the trusted state information that corresponds to the device. The identifying information may be any information that identifies the device and can include any of the information that was utilized to tag or mark the trusted state information that was stored within the data store.

Since the trusted state information may be encrypted within the data store, the validation system may have to provide encryption information to unencrypt the trusted state information. For example, if the encryption technique utilized to encrypt the information within the data store utilized a public/private key pair, the validation system may provide the appropriate key to unencrypt the trusted state information so that it can be read by the validation system. Additionally, encryption information, credentials, or other authentication techniques may be utilized by the device validation system when accessing the data store. Thus, the system may be designed to provide authentication information to the data store to ensure that unauthorized users or entities are unable to access the data store and access the trusted state information for devices. Authentication mechanisms may be set by the manufacturer or other entity that controls the data store, meaning that entities may be set up with authentication information or protocols so that the data store may be accessed for the trusted state information.

The authentication information may be at least partially derived based upon the device information. For example, instead of setting up each possible entity that may need to access the data store with authentication information, the authentication information may derivable from the device information. Thus, when the device validation system accesses the data store and provides any authentication information that is derived from the device information, upon successful authentication, the device validation system may only be able to access the trusted state information for the specific device. In this case, the device validation system may not have to provide additional information to the data store in order to find the correct or corresponding trusted state information for the device because the device identifiers or other identifying information can be derived or identified based upon the authentication information. The authentication information, whether provided to the device validation system independently or derived from the device information, may include any type of authentication mechanism, for example, encryption components, credentials, codes, program instructions, and/or the like.

Using the trusted state information corresponding to the device and the current state information received from the device, the device validation system may identify a modification state of the device by comparing the current state information to the trusted state information corresponding to the device. Since the current state information and the trusted state information contain similar information, the validation system can compare the current state information to the trusted state information and identify any mismatches between the information. The mismatches may be identified and marked, listed, or otherwise recorded by the validation system. The identification of the mismatches may include identifying specifics of the mismatch or may generally identify the mismatch. For example, if a processor has been swapped, the system may generally identify a mismatch between the current state processor and the trusted state processor or may specifically identify that a model, serial number, capabilities, and/or the like, of the processor are mismatched. As another example, if software code has been modified, the system may generally identify a mismatch between the current software code modules and the trusted software code module or may specifically identify the lines or portions of the code within the software code module that has been modified.

The validation system may be able to determine if some modifications are allowed or authorized and would indicate that the device was allowably modified. Allowable modifications may be marked as such and may result in the validation system indicating that no modifications were made. In this case, no modifications would actually be no unauthorized modifications. Thus, the modification state may be identified as clean or no modifications, even if modifications were made as long as they are authorized modifications. For example, many devices allow an end user to upgrade or swap memory components. As another example, modifications made by authorized entities may be acceptable modifications. However, while this would constitute a modification from the trusted state, such a modification is allowed and authorized. Thus, the device validation system would mark such a device having only this modification as a clean modification state.

Otherwise, the validation system may mark all modifications, whether authorized or not, as modifications, thereby resulting in a failed or modified modification state. The validation system may provide an indication of the modifications and allow a user to determine if the modification is authorized or a problem. Whether the validation system identifies modifications as acceptable or not may be configured by the validation system user or entity, the manufacturer, trusted state information generators, and/or the like. The validation system may also utilize machine-learning, learning algorithms, or other artificial intelligence algorithms, to learn what constitutes an acceptable modification.

A machine-learning model, or other artificial intelligence algorithm, may utilize historical information regarding modifications between trusted state information and current state information and information regarding whether those modifications are acceptable (e.g., user feedback, crowd-sourced information, user input, etc.) to learn correlations between identified modifications and acceptable modification. Based upon these correlations, the model can learn and make inferences regarding modifications and whether these are acceptable modifications. In other words, the model can utilize historical information to train itself and the make predictions regarding whether an identified modification would be acceptable. The model can continually learn over time and become more accurate based upon the predictions made by the model and any feedback that can be automatically ingested by the model that would indicate whether the prediction was correct or not. Such feedback may include direct user feedback, user inputs that can be used to derive feedback (e.g., the user changing a prediction made by the model, crowd sourced user inputs regarding model predictions, user inputs directed toward other similar modifications and acceptability thereof, etc.), trusted state information generators indications of acceptable modifications, and/or the like.

Accordingly, at 303, the system may determine if the modification state indicates the device has been modified from the trusted state. The modification state may be any type of state that indicates the device has not been modified, for example, a clean modification state, an unmodified modification state, an acceptable modification state, and/or the like. In other words, any term for an unmodified modification state may be utilized. The modification state may be any type of state that indicates the device has been modified, for example, a dirty modification state, a modified modification state, a failed modification state, an unacceptable modification state, and/or the like. In other words, any term for a modified modification state may be utilized.

Once the modification state is identified, the device validation system provides a notification on an output component of the device validation system indicating whether the device has been modified from the trusted state information based upon the identified modification state of the device. Thus, if the modification state indicates that the device has been modified, the system may provide a notification indicating that a modification has been made to the device at 305. If, on the other hand, the modification state indicates that the device has not been modified, the system may provide a notification indicating that no modification has been made to the device at 304. The notification can take many different forms and may be dependent on the output component that is utilized to provide the notification. For example, an audible notification may be provided on an audio output component, a visual notification may be provided on a display component, a haptic notification may be provided using a haptic output device, and/or the like. Thus, any type of output component may be utilized and the notification can be optimized or adapted to the selected output component.

An audible notification may include a specific sound pattern indicating a clean modification state and a different sound pattern indicating a failed or unclean modification state. An audible notification may include a phrase indicating the modification state. A visual notification may be in many different forms, for example, a pop-up window, display changes (e.g., from one color to another, animation, etc.), a modification state icon, words or instructions indicating the modification state, and/or the like. Using the augmented reality display example discussed above, the augmented reality display may be overlayed with one color indicating a clean modification state and overlaid with a different color indicating a failed modification state. A haptic notification may include a specific haptic pattern indicating a clean modification state and a different haptic pattern indicating a failed modification state.

In addition to identifying the modification state within the notification, the notification may identify the specific modifications that were identified. Identification of the specific modifications may simply identify the hardware component, software module, application, firmware, certificate, and/or the like, that was modified. The identification may also identify the specifics of the modifications, for example, lines of code that were modified, component specifications, and/or the like. Alternatively, or additionally, in the case that a general identification of the modification is provided, the system may allow the user to select or otherwise indicate the modification to learn additional details regarding the modification, including the specifics of the modification.

In response to providing the notifications, the system may allow a user to provide feedback regarding the modification. For example, the user may indicate whether the modification is acceptable or not. Such feedback may also be utilized by any machine-learning models or other artificial intelligence algorithms to learn more about acceptable modifications. The user may also be able to provide other input regarding the modification. For example, the user may be able to provide instructions to the device to isolate the modification so that the modification cannot transition to other parts of the device. As another example, the user may be able to provide instructions to the device to reset the device to the trusted state configuration. Inputs provided by the user regarding actions to take in response to modifications can be utilized by one or more machine-learning models to learn how modifications should be addressed. This can allow a model to train itself to respond to modifications and eventually take automated steps to address different modifications.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
receiving, at a device validation system of an information handling device and utilizing a wireless communication mechanism, current state information identifying a current configuration of the information handling device, wherein the receiving the current state information comprises receiving an encrypted form of the information and wherein the current state information identifies components and software installed on the information handling device;
obtaining, using the device validation system comprising a decryption model and from a data store comprising trusted state information for a plurality of devices, trusted state information for the information handling device that identifies a trusted configuration of the information handling device, wherein the trusted state information comprises an encrypted form of the information and wherein the decryption model permits decrypting the trusted state information and the current state information;
identifying, using the device validation system, a modification state of the information handling device by comparing the current state information to the trusted state information of the information handling device; and providing, at an output component of the device validation system, a notification indicating whether the information handling device has been modified from the trusted state information based upon the identified modification state of the information handling device.

2. The method of claim 1, wherein the obtaining comprises querying the data store utilizing identifiers of the information handling device for the trusted state information corresponding to the information handling device.

3. The method of claim 1, wherein the trusted state information for each of the plurality of devices is stored in an encrypted format within the data store.

4. The method of claim 1, wherein the receiving is responsive to the information handling device performing a system scan to identify the current state information.

5. The method of claim 1, wherein the wireless communication mechanism comprises a transmission-only communication mechanism.

6. The method of claim 1, wherein the current state information and the trusted state information are produced at different locations within a supply chain system.

7. The method of claim 1, wherein the providing comprises providing the notification on a display screen of the device validation system, wherein the device validation system comprises an augmented reality headset.

8. The method of claim 1, wherein the wireless communication mechanism comprises a method selected from the group consisting of: near field communication, quick response code, short range communication, radio frequency communication, and ultrasonic communication.

9. The method of claim 1, wherein the modification state comprises identifying at least one configuration difference between the current state information and the trusted state information of the information handling device.

10. The method of claim 9, wherein the at least one configuration difference is a mismatch present between the current state information and the trusted state information of the information handling device;
wherein the mismatch identifies at least one of: a general configuration difference and a specific configuration difference.

11. The method of claim 1, wherein the device validation system determines an allowability of at least one modification to the current state information of the information handling based on the trusted state information obtained;
wherein the device validation system provides an indication of each of the at least one modification to the current state of the information.

12. The method of claim 1, wherein the device validation system employees a machine-learning model to learn and identify correlations between identified modifications and acceptable modifications.

13. A system, the system comprising:
a wireless communication mechanism;
a processor operatively connected to the wireless communication mechanism;
a memory device that stores instructions that, when executed by the processor, causes the system to:
receive, at a device validation system of an information handling device and utilizing the wireless communication mechanism, current state information identifying a current configuration of the information handling device, wherein to receive the current state information comprises receiving an encrypted form of the information and wherein the current state information identifies components and software installed on the information handling device;

obtain, using the device validation system comprising a decryption model and from a data store comprising trusted state information for a plurality of devices, trusted state information for the information handling device that identifies a trusted configuration of the information handling device, wherein the trusted state information comprises an encrypted form of the information and wherein the decryption model permits decrypting the trusted state information and the current state information;
identify, using the device validation system, a modification state of the information handling device by comparing the current state information to the trusted state information of the information handling device; and
provide, at an output component of the device validation system, a notification indicating whether the information handling device has been modified from the trusted state information based upon the identified modification state of the information handling device.

14. The system of claim 13, wherein the obtaining comprises querying the data store utilizing identifiers of the information handling device for the trusted state information corresponding to the device.

15. The system of claim 13, wherein the trusted state information for each of the plurality of devices is stored in an encrypted format within the data store.

16. The system of claim 13, wherein the receiving is responsive to the information handling device performing a system scan to identify the current state information.

17. The system of claim 13, wherein the wireless communication system comprises a transmission-only communication mechanism.

18. The system of claim 13, wherein the current state information and the trusted state information are produced at different locations within a supply chain system.

19. The system of claim 13, wherein the providing comprises providing the notification on a display screen of the information handling device validation system, wherein the device validation system comprises an augmented reality headset.

20. A product, the product comprising:
a computer-readable storage device that stores executable code that, when executed by a processor, causes the product to:
receive, at a device validation system of information handling device and utilizing a wireless communication mechanism, current state information identifying a current configuration of the information handling device, wherein to receive the current state information comprises receiving an encrypted form of the information and wherein the current state information identifies components and software installed on the information handling device;
obtain, using the device validation system comprising a decryption model and from a data store comprising trusted state information for a plurality of devices, trusted state information for the information handling device that identifies a trusted configuration of the device, wherein the trusted state information comprises an encrypted form of the information and wherein the decryption model permits decrypting the trusted state information and the current state information;
identify, using the device validation system, a modification state of the information handling device by comparing the current state information to the trusted state information of the information handling device; and provide, at an output component of the device validation system, a notification indicating whether the information handling device has been modified from the trusted state information based upon the identified modification state of the information handling device.

* * * * *